W. HUMPHREY.
EGG TESTING DEVICE.
APPLICATION FILED NOV. 9, 1911.

1,033,017.

Patented July 16, 1912.

Witnesses
L. B. James
E. B. Hunt

Inventor
William Humphrey
by H. B. Willson & Co.
Attorneys

UNITED STATES PATENT OFFICE.

WILLIAM HUMPHREY, OF AUBURN, NEBRASKA.

EGG-TESTING DEVICE.

1,033,017.  Specification of Letters Patent.  Patented July 16, 1912.

Application filed November 9, 1911. Serial No. 659,328.

*To all whom it may concern:*

Be it known that I, WILLIAM HUMPHREY, a citizen of the United States, residing at Auburn, in the county of Nemaha and State of Nebraska, have invented certain new and useful Improvements in Egg-Testing Devices; and I do declare the following to be a full, clear, and exact description of the invention, such as will enable others skilled in the art to which it appertains to make and use the same.

This invention relates to improvements in egg testing devices.

One object of the invention is to provide an egg testing device having arranged therein an electric lamp and which is provided with an improved construction and arrangement of switch adapted to be automatically operated when the eggs are placed in position for testing.

Another object is to provide a device of this character which will be simple and inexpensive in construction, efficient, reliable and economical in operation and which is well adapted to the purpose for which it is designed.

With these and other objects in view the invention consists of certain novel features of construction, and the combination and arrangement of parts as will be more fully described and claimed.

Figure 1:
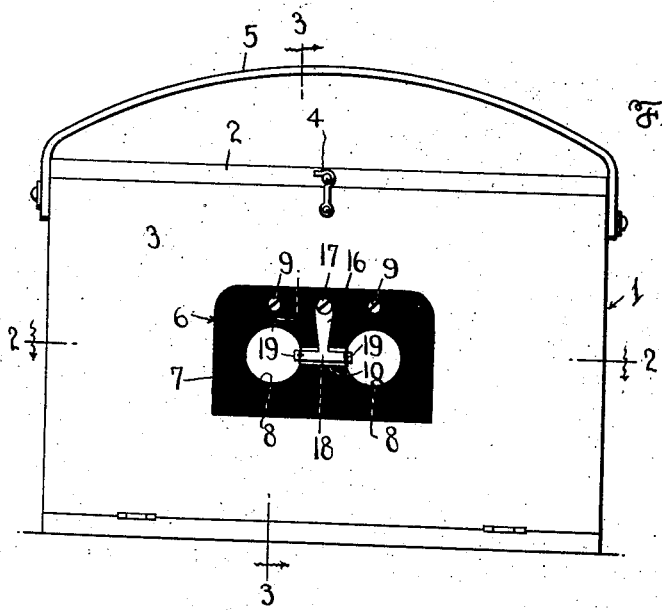
Figure 3:
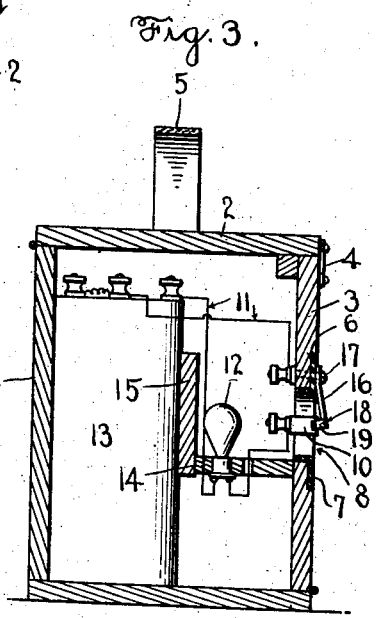
Figure 2:
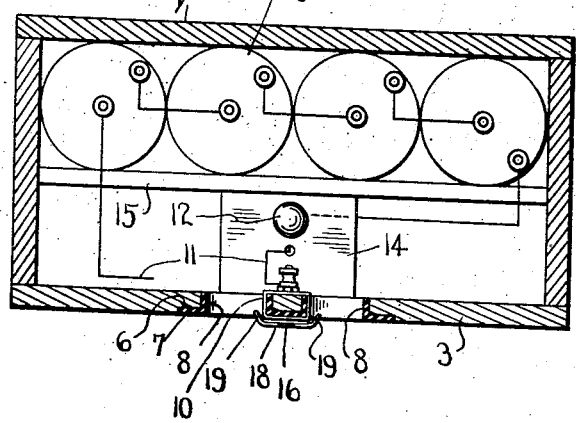
Figure 4:
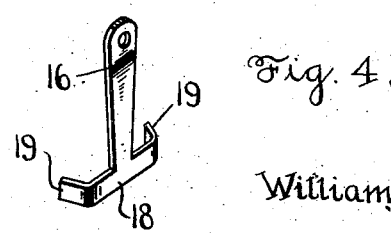

In the accompanying drawings; Figure 1 is a front view of an egg testing machine embodying the invention; Fig. 2 is a horizontal sectional view thereof on the line 2—2 of Fig. 1; Fig. 3 is a vertical cross sectional view on the line 3—3 of Fig. 1; Fig. 4 is a detail perspective view of the movable member of the light controlling switch of the device.

In the embodiment of the invention, I provide a box or casing 1, the top and front sides of which are provided with doors 2 and 3 which are preferably hinged respectively to the back and bottom of the box as shown. The doors 2 and 3 when closed are fastened together and held in closed position by a hook 4 as shown or other form of fastening device. The box is preferably provided with a handle 5 having its ends secured to the ends of the box whereby the latter may be readily carried from place to place.

In the front of the box are two egg-receiving holes in which are inserted sleeves 8 which with flanges 6, form insulators 7, which are secured to the front of the box by screws 9, as shown. Arranged across or around the central portion of the plate 7 and front 3 is a metal band 10 which forms the stationary member of an electric switch, said member having connected therewith one terminal of an electric circuit or current conducting wire 11 in which is arranged a lamp 12 and a battery 13. The lamp 12 is preferably secured to a supporting bracket 14 arranged on the inner side of the front 3 of the box immediately below and in rear of the egg receiving openings. The battery 13 is here shown and preferably consists of a series of dry cells suitably connected together and held in position in the box 1 by a horizontally disposed board or plate 15. The movable member of the switch comprises a spring arm 16 secured at one end to a binding post 17 arranged through the front 3 and having connected to its inner end the other terminal of the electric circuit or current conducting wire 11. On the outer end of the spring arm of the switch are formed oppositely extending contact arms 18, said arms corresponding in length to the length of the plate or stationary member 10 of the switch and having their ends bent inwardly at obtuse angles to form combined switch operating and contact lugs 19 which project into the holes or openings in the front 3 and plate 7 whereby when an egg is inserted in one or both of said holes the pressure of the egg or eggs against one or both of said lugs will force the spring arm 16 inwardly and the contact arms 18 and lugs 19 into engagement with the stationary member of the switch, thus closing the latter and completing the electric circuit through the lamp.

By constructing and arranging the movable switch member as herein shown and described, it will be seen that the circuit is closed and the lamp lighted each time eggs are placed in one or both of the openings in the front of the box 3 and plate 7 thus enabling the condition of the egg to be readily observed. It will also be noted that as soon as the eggs are removed from the holes the spring arm of the switch will immediately open the latter, thus breaking the electric circuit so that the current is only used while the eggs are in position for testing. This arrangement of the switch provides for a considerable saving of the electric current over other forms of testers in which the current is not automatically cut off.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. An egg testing device comprising a box having an egg receiving opening, an electric lamp arranged in said box, and a switch comprising a stationary member connected with one terminal of an electric circuit, a spring retracted member connected with the other terminal of an electric circuit, a contact arm on said spring retracted member, a combined switch operating and contact lug on said arm adapted to be engaged by the egg when placed in said box opening and to be thereby actuated to depress the switch member and bring the contact arm thereof into engagement with the stationary member of the switch, said switch being automatically opened by the spring member thereof when the egg is removed.

2. An egg testing device comprising a box having egg receiving openings, an electric circuit arranged in the box, said circuit having therein a battery, a lamp and a switch, said switch comprising a stationary member connected with one terminal of the circuit, a spring retracted member connected with the other terminal of the circuit, contact arms arranged on said spring retracted member, and combined switch operating and contact lugs formed on said arms and adapted to be engaged by the eggs when placed in the openings in said box and to be thereby actuated to depress the switch member and bring the contact arms thereof into engagement with the stationary member of the switch whereby the circuit is closed while the eggs are in position for testing, said switch being automatically opened by the spring member thereof when the eggs are removed.

In testimony whereof I have hereunto set my hand in presence of two subscribing witnesses.

WILLIAM HUMPHREY.

Witnesses:
W. H. BOUSFIELD,
E. FERNEAU.

---

Copies of this patent may be obtained for five cents each, by addressing the "Commissioner of Patents, Washington, D. C."